US008889091B2

(12) United States Patent
Schulz et al.

(10) Patent No.: US 8,889,091 B2
(45) Date of Patent: Nov. 18, 2014

(54) MANUFACTURE OF LIPO$_2$F$_2$ FROM POF$_3$ OR PF$_5$

(75) Inventors: Alf Schulz, Wedemark (DE); Placido Garcia-Juan, Hannover (DE)

(73) Assignee: Solvay SA, Brussels (BE)

( * ) Notice: Subject to any disclaimer, the term of this patent is extended or adjusted under 35 U.S.C. 154(b) by 129 days.

(21) Appl. No.: 13/813,387

(22) PCT Filed: Jul. 29, 2011

(86) PCT No.: PCT/EP2011/063106
§ 371 (c)(1),
(2), (4) Date: Jan. 30, 2013

(87) PCT Pub. No.: WO2012/016924
PCT Pub. Date: Feb. 9, 2012

(65) Prior Publication Data
US 2013/0129595 A1 May 23, 2013

(30) Foreign Application Priority Data

Aug. 4, 2010 (EP) .................................. 10171881
Oct. 19, 2010 (EP) .................................. 10188108

(51) Int. Cl.
*C01B 25/10* (2006.01)
*H01M 10/0561* (2010.01)
*C01B 25/455* (2006.01)
*H01M 10/0563* (2010.01)
*C01D 15/00* (2006.01)
*H01M 10/052* (2010.01)

(52) U.S. Cl.
CPC ......... *H01M 10/0561* (2013.01); *C01B 25/455* (2013.01); *Y02E 60/122* (2013.01); *H01M 10/0563* (2013.01); *C01D 15/00* (2013.01); *H01M 10/052* (2013.01)
USPC ....................................................... 423/301

(58) Field of Classification Search
None
See application file for complete search history.

(56) References Cited

U.S. PATENT DOCUMENTS

| 5,427,874 | A | 6/1995 | Sugeno |
| 6,645,451 | B1 | 11/2003 | Schulz et al. |
| 8,076,033 | B2 | 12/2011 | Kato et al. |
| 8,293,411 | B2 | 10/2012 | Nishida et al. |

| 2008/0102376 | A1* | 5/2008 | Kato et al. ................... 429/332 |
| 2008/0305402 | A1 | 12/2008 | Kato et al. |
| 2010/0323240 | A1 | 12/2010 | Tsujioka et al. |

FOREIGN PATENT DOCUMENTS

| DE | 10016816 A1 | 10/2001 |
| EP | 0385724 A2 | 9/1990 |
| EP | 0643433 A1 | 3/1995 |
| EP | 0662729 A1 | 7/1995 |
| EP | 0816287 A1 | 1/1998 |
| EP | 2061115 A1 | 5/2009 |
| EP | 2065339 A1 | 6/2009 |
| JP | 2005-219994 A | 8/2005 |
| JP | 2006-143572 A | 6/2006 |
| WO | WO 2008111367 A1 | 9/2008 |
| WO | WO 2010064637 A1 | 6/2010 |
| WO | WO 2012004187 A2 | 1/2012 |
| WO | WO 2012004188 A1 | 1/2012 |
| WO | WO 2013023902 A1 | 2/2013 |

OTHER PUBLICATIONS

Ue, Makoto, et al—"Electrochemical Properties of Organic Liquid Electrolytes Based on Quaternary Onium Salts for Electrical Double-Layer Capacitors", 1994, Journal of The Electrochemical Society, vol. 141, Issue No. 11, pp. 2989-2996; 9 pgs.
Lie, L.H.—et al—"Fluorinated Organic Solvents in Electrolytes for Lithium Ion Cells", 1999, ITE Battery Letters, vol. 1, Issue No. 1, pp. 105-109; 5 pgs.
U.S. Appl. No. 13/808,241, Placido Garcia-Juan, et al, filed Jan. 3, 2012.
U.S. Appl. No. 13/808,242, Placido Garcia-Juan, et al, filed Jan. 3, 2013.

* cited by examiner

*Primary Examiner* — Ngoc-Yen Nguyen
*Assistant Examiner* — Anita Nassiri Motlagh
(74) *Attorney, Agent, or Firm* — Beatrice C. Ortego

(57) ABSTRACT

LiPO$_2$F$_2$, an electrolyte salt additive for batteries, is manufactured by the reaction of POF$_3$, PF$_5$ or mixtures thereof, with Li$_3$PO$_4$ forming a reaction mixture comprising LiPO$_2$F$_2$. When POF$_3$ is applied, the reaction mixture which contains essentially only LiPO$_2$F$_2$ is preferably extracted from the reaction mixture with a solvent which also is applicable as solvent for lithium ion batteries. If PF$_5$ is applied, then, depending on the molar ratio of PF$_5$ and Li$_3$PO$_4$, the reaction mixture also contains LiF and/or LiPF$_6$. To isolate pure LiPO$_2$F$_2$ from LiF, the reaction mixture containing essentially only LiPO$_2$F$_2$ and LiF may for example, be extracted with dimethoxyethane, acetone, dimethyl carbonate or propylene carbonate. To isolate pure LiPO$_2$F$_2$ from LiPF$_6$, the reaction mixture containing essentially only these constituents is preferably extracted with a solvent which also is applicable as solvent for the LiPF$_6$ in lithium ion batteries to dissolve and remove LiPF$_6$.

17 Claims, No Drawings

MANUFACTURE OF LIPO₂F₂ FROM POF₃ OR PF₅

CROSS-REFERENCE TO RELATED APPLICATIONS

The present application is a U.S. national stage entry under 35 U.S.C. §371 of International Application No. PCT/EP2011/063106 filed Jul. 29, 2011, which claims benefit of the priorities of European patent application No 10171881.5 filed Aug. 4, 2010, and of European patent application No 10188108.4 filed on Oct. 19, 2010, the whole content of each of these applications being incorporated herein for all purposes.

TECHNICAL FIELD OF THE INVENTION

The present invention relates to a method for the manufacture of $LiPO_2F_2$; more specifically, it relates to a method for the manufacture of $LiPO_2F_2$ comprising a step of reacting a compound which has a P—F bond and is selected from the group consisting of phosphorus pentafluoride ($PF_5$), phosphoryl fluoride ($POF_3$), and mixtures thereof, and lithium orthophosphate ($Li_3PO_4$). The present invention is also directed to the use of $POF_3$ in the manufacture of $LiPO_2F_2$.

BACKGROUND OF THE INVENTION

Lithium difluorophosphate, $LiPO_2F_2$, is useful as electrolyte salt or additive for an electrolyte composition comprising an electrolyte salt for lithium ion batteries. Thus, WO 2008/111367 discloses how to manufacture a mixture of $LiPF_6$ and $LiPO_2F_2$ from a halide other than a fluoride, $LiPF_6$ and water. The resulting salt mixture, dissolved in aprotic solvents, is used as an electrolyte solution for lithium ion batteries. EP-A-2 061 115 describes, as state of the art at that time, the manufacture of $LiPO_2F_2$ from $P_2O_3F_4$ and Li compounds, and, as invention, the manufacture of $LiPO_2F_2$ from $LiPF_6$ and compounds with a Si—O—Si bond, e.g., siloxanes. US 2008-305402 and US 2008/102376 disclose the manufacture of $LiPO_2F_2$ from $LiPF_6$ with a carbonate compound; according to US 2008/102376, $LiPF_6$ decomposes at 50° C. and above under formation of $PF_5$; according to other publications, $PF_5$ is only formed at and above the melting point of $LiPF_6$ (~190° C.). EP-A-2 065 339 discloses how to manufacture a mixture of $LiPF_6$ and $LiPO_2F_2$ from a halide other than a fluoride, $LiPF_6$ and water. The resulting salt mixture, dissolved in aprotic solvents, is used as an electrolyte solution for lithium ion batteries.

However, the above methods are technically difficult and produce a greater amount of a by-product such as LiF which is not industrially interesting and thus would incur additional cost for the waste treatment. Further the starting material, $LiPF_6$, is expensive and thus its use increases the production cost. Consequently, there has been a need to develop new processes, which are capable of avoiding the drawbacks indicated above.

DESCRIPTION OF THE INVENTION

Object of the present invention is to provide $LiPO_2F_2$ in a technically feasible and economical manner. This object and other objects are achieved by the invention as outlined in the patent claims.

According to one aspect of the present invention, $LiPO_2F_2$ is manufactured by the reaction of $Li_3PO_4$ and a compound having a P—F bond which compound is selected from the group consisting of $POF_3$, $PF_5$, and mixtures thereof. The resulting reaction mixture thereby obtained comprises $LiPO_2F_2$.

According to one embodiment, $LiPO_2F_2$ is manufactured from $PF_5$ and $Li_3PO_4$. Both are cheap starting materials. Depending on the molar ratio of $PF_5$ and $Li_3PO_4$, the reaction mixture may comprise LiF and/or $LiPF_6$ according to the reaction equations $$PF_5 + Li_3PO_4 \rightarrow 2LiPO_2F_2 + LiF \qquad (I)$$

$$2PF_5 + Li_3PO_4 \rightarrow 2LiPO_2F_2 + LiPF_6 \qquad (II)$$

Especially the reaction according to equation (II) is advantageous because the $LiPF_6$ produced is a valuable product per se.

According to another embodiment of the present invention, $LiPO_2F_2$ is manufactured by the reaction of phosphoryl fluoride ($POF_3$) and lithium orthophosphate ($Li_3PO_4$).

$$2POF_3 + Li_3PO_4 \rightarrow 3LiPO_2F_2 \qquad (III)$$

Since no by-product is ideally produced from this reaction, the purity of $LiPO_2F_2$ is very high even without purification when compared to the process of the prior art where the reaction mixture contains at least one byproduct such as LiF.

Phosphoryl fluoride ($POF_3$) can be obtained commercially, e.g., from ABCR GmbH & Co. KG, or can be prepared by a known process in the art. For example, $POF_3$ can be prepared by fluorination of phosphoryl chloride with HF and/or other fluorinating agents, for example, $ZnF_2$. Alternatively, it may be also prepared by the reaction of $H_3PO_4/P_2O_5$, $HF/H_2O$ and $SO_3/H_2SO_4$. Sometimes, the $POF_3$ obtained may contain $PF_5$ as impurity, or vice versa, $PF_5$ may comprise $POF_3$ as impurity. The advantage of the process of the invention is that even such mixtures can be applied without impact on the yield.

$PF_5$ may be obtained commercially, e.g., from Praxair, or it may be prepared from $PCl_5$ and HF or, as described in EP-A-0 0816287, for example from $PCl_3$, $Cl_2$ and HF.

$Li_3PO_4$ is commercially available, e.g., from Strem Chemicals, Inc, Newburyport, USA, or from Chemetall GmbH, Germany. It is a solid with a melting point far above 1000° C.

Consequently, the reactions of the invention are gas-solid reactions or, if a solvent for $POF_3$ or $PF_5$, respectively, is applied, a gas-liquid-solid reaction or a liquid-solid reaction.

Preferably, the reaction between $PF_5$ and $Li_3PO_4$, between $POF_3$ and $Li_3PO_4$ and between mixtures of $POF_3$ and $PF_5$, respectively, and $Li_3PO_4$ is performed in the absence of water or moisture. Thus, the reaction may be performed at least for a part of its duration in the presence of an inert gas; dry nitrogen is very suitable, but other dry inert gases may be applied, too. The reaction can be performed in an autoclave-type vessel or in other reactors. It is preferred to perform the reaction in apparatus made from steel or other materials resistant against corrosion, e.g., in reactors made of or clad with Monel metal.

$Li_3PO_4$ is preferably applied in the form of small particles, e.g., in the form of a powder. If desired, it can be dried before introducing it into the reaction with $POF_3$, $PF_5$ and mixtures thereof.

The reactants $POF_3$ or $PF_5$, respectively, can be introduced into the reaction in gaseous form or in the form of a solution in suitable aprotic organic solvents. Suitable solvents are, for example, ether compounds, e.g., diethyl ether, and organic solvents which are useful as solvents in lithium ion batteries; many examples of such solvents, for example, especially organic carbonates, but also lactones, formamides, pyrrolidinones, oxazolidinones, nitroalkanes, N,N-substituted urethanes, sulfolane, dialkyl sulfoxides, dialkyl sulfites, acetates, nitriles, acetamides, glycol ethers, dioxolanes, dialkyloxyethanes, trifluoroacetamides, are given below.

In other embodiments, $POF_3$ is introduced into the reactor in complex form, especially in the form of a donor-acceptor complex such as $POF_3$-amine complexes. Those complexes include $POF_3$-pyridine, $POF_3$-trietylamine, $POF_3$-tributylamine, $POF_3$-DMAP(4-(dimethylamino) pyridine), $POF_3$-DBN(1,5-diazabicyclo[4.3.0]non-5-ene), $POF_3$-DBU(1,8-diazabicyclo[5.4.0]undec-7-ene), and $POF_3$-methylimidazole. In specific embodiments, a separate vessel can be used to supply $POF_3$ to the reactor vessel. $PF_5$, too, can be introduced in such manner into the reactor.

$POF_3$, $PF_5$ and any mixtures thereof are preferably introduced into the reactor in gaseous form or in the form of a solution in an aprotic organic solvent. $POF_3$, $PF_5$ and any mixtures thereof are more preferably introduced into the reactor in gaseous form.

Preferably, no HF is added to the reaction mixture. Preferably, no difluorophosphoric acid is added to the reaction mixture. Preferably, equal to or more than 80%, more preferably, equal to or more than 85%, and most preferably, 100% of the P content in $LiPO_2F_2$ produced originate from $PF_5$ or $POF_3$ and $Li_3PO_4$ introduced into the reaction according to equations (I), (II) and (III), and less than 20% and preferably less than 5% of the P content in $LiPO_2F_2$ produced originates from added $LiPF_6$; most preferably, no $LiPF_6$ is added at all.

The reaction time is selected such that the desired degree of conversion is achieved. Often, a reaction time of 1 second to 5 hours gives good results for the reaction between $POF_3$, $PF_5$ and any mixtures thereof with $Li_3PO_4$. For the reaction between $POF_3$ and $Li_3PO_4$, a preferred reaction time of 0.5 to 2 hours, most preferably of around 1 hour gives good results. For the reaction between $PF_5$ or mixtures of $PF_5$ and $POF_3$ and $Li_3PO_4$, a preferred reaction time of 0.5 to 2 hours, most preferably of around 1 hour gives good results, too. The reaction speed is very fast.

The reaction temperature is preferably equal to or higher than 0° C. Preferably, the reaction temperature is equal to or lower than 100° C.

The reaction temperature when reacting $PF_5$ and $Li_3PO_4$ is preferably equal to or lower than 70° C., more preferably, it is equal to or lower than 50° C. Still more preferably, it is lower than 50° C., and especially preferably, it is lower than 45° C. Advantageously, the reaction of $PF_5$ with $Li_3PO_4$ is performed at a temperature from 15 to 35° C., preferably at a temperature from 20 to 30° C., and most preferably, at ambient temperature.

When $POF_3$ and $Li_3PO_4$ are reacted, the reaction temperature is preferably equal to or higher than ambient temperature (25° C.), more preferably, equal to or higher than 50° C. The reaction temperature is preferably equal to or lower than 100° C., more preferably equal to or lower than 90° C. A preferred range of temperature is from 50 to 90° C.

If desired a reactor can be applied with internal heating or cooling means, or external heating or cooling means. It may have, for example, lines or pipes with a heat transfer agent like water.

The reaction between $POF_3$, $PF_5$ or their mixtures with $Li_3PO_4$ may be performed at ambient pressure (1 bar abs.). Preferably, the reaction of $POF_3$, $PF_5$ or their mixtures with $Li_3PO_4$ is performed at a pressure higher than 1 bar (abs.), more preferably at a pressure higher than 3 bar (abs.), most preferably, higher than 5 bar (abs). As the reaction proceeds, $POF_3$ and $PF_5$, respectively, are consumed, and the pressure may consequently be decreasing, in an autoclave for example.

The upper limit of the pressure during the reaction is not critical. Often, for practical reasons, the pressure is equal to or lower than 30 bar (abs).

The reaction of $POF_3$ and $PF_5$ or their mixtures with $Li_3PO_4$ can be performed batch wise, for example, in an autoclave. The reactor may have internal means, e.g., a stirrer, to provide a mechanical impact on the surface of the solid particles of $Li_3PO_4$ to remove reaction product from the surface and provide an unreacted fresh surface. It is also possible to shake or rotate the reactor itself.

Alternatively, the reaction can be performed continuously, for example, in a flow reactor. For example, the $Li_3PO_4$ may be provided in the form of a bed; $POF_3$, $PF_5$ or their mixtures may be passed through this bed until a "breakthrough" of $POF_3$ or $PF_5$ is observed indicating the end of the reaction. If desired, dry inert gas like nitrogen or noble gases may be passed through the $Li_3PO_4$ bed to remove oxygen, moisture or both before performing the reaction.

If the reaction is performed continuously, for example, $Li_3PO_4$ may be kept in the form of a bed in a flow reactor, e.g., as a fluidized bed, and $POF_3$ or $PF_5$ or their mixtures is continuously passed through the bed. Continuously, $POF_3$ and/or $PF_5$ and unreacted $Li_3PO_4$ may be introduced into the reactor, and continuously, reaction product may be withdrawn from the reactor. Means, for example, moving parts, e.g., stirrers, may be foreseen in the reactor which provide a mechanical impact on the surface of the solid particles to remove reaction product from their surface and to provide unreacted $Li_3PO_4$.

If desired, the reaction may be performed in a solvent, e.g., an organic polar aprotic solvent. Preferably, the $Li_3PO_4$ is dispersed therein. While it is not expected that a significant amount of $Li_3PO_4$ will dissolve in such a solvent, at least the solvent may serve to dissolve reaction products like LiF or $LiPF_6$ thus making the isolation of $LiPO_2F_2$ easier. If desired, the $POF_3$ and $PF_5$ or their mixtures, respectively, may be introduced into the reaction dissolved in an aprotic polar solvent, for example, in an ether, e.g., in a dialkyl ether, for example, in diethyl ether, or in other solvents, and especially in one of the solvents for lithium ion batteries mentioned below. Since $LiPF_6$ is much better soluble in these solvents than $LiPO_2F_2$, the reaction between $POF_3$ or $PF_5$ and $Li_3PO_4$ and the subsequent removal of formed $LiPF_6$ can be performed in the same reactor in a kind of "1-pot process". This is especially preferred if a reaction between $POF_3$ and $Li_3PO_4$ is performed because ideally, no by-product is formed, and also for the reaction between $PF_5$ and $Li_3PO_4$ because the reaction can be performed such (by providing a relatively high molar ratio of $PF_5:Li_3PO_4$, e.g., from 2 to 4) that the formation of LiF as by-product is suppressed and the formation of $LiPF_6$ as by-product is increased; this is explained below.

If desired, after termination of the reaction, a vacuum may be applied, or dry inert gas like nitrogen or noble gases may be passed through the $LiPO_2F_2$ bed, to remove solvents or residual $POF_3$ or $PF_5$.

The resulting reaction mixture is present in solid form if no solvent is used. If desired, the solid may be comminuted, e.g., milled, to provide a larger contact surface if it is intended to dissolve constituents of it.

If desired, the $LiPO_2F_2$ formed can be isolated from the resulting reaction mixture which may comprise LiF and/or $LiPF_6$.

In the following, the reaction of $PF_5$ and $Li_3PO_4$ is explained in more detail.

The molar ratio of $PF_5$ to $Li_3PO_4$ is preferably equal to or greater than 0.9:1. It is more preferably equal to or greater than 1:1.

Depending on the molar ratio of $PF_5$ and $Li_3PO_4$, the reaction with $Li_3PO_4$ can be influenced in view of the formation of LiF or $LiPF_6$ as preferred side product.

According to one embodiment, the molar ratio of $PF_5$ to $Li_3PO_4$ is equal to or lower than 2:1, more preferably, lower than 2:1. If the molar ratio of $PF_5$ and $Li_3PO_4$ is between 0.9:1, preferably 1:1, and 2:1, it is expected that LiF and $LiPF_6$ are formed and are present in the reaction mixture. The closer the ratio of $PF_5$ and $Li_3PO_4$ is to 2:1, the more $LiPF_6$ is expected to be formed. The presence of $LiPF_6$ as reaction product has the advantage that it can be separated from $LiPO_2F_2$ very easily as is shown below because its solubility is much higher than that of $LiPO_2F_2$ in a lot of organic solvents. The disadvantage is that $LiPF_6$ is much more sensitive to moisture than LiF. To separate $LiPO_2F_2$ from LiF, it is preferred to apply a solvent for $LiPO_2F_2$ as explained below. It is possible and in some embodiments it is preferred that the resulting reaction mixture is heated to decompose $LiPF_6$ to form LiF and $PF_5$. For example, if both LiF and $LiPF_6$ are present as impurities, LiF is provided as single impurity thus making work-up easier.

According to another embodiment, the molar ratio of $PF_5$ to $Li_3PO_4$ is equal to or greater than 2:1. It is preferably equal to or lower than 4, more preferably, it is lower than 4, still more preferably, it is equal to or lower than 3. In this embodiment, $LiPO_2F_2$ is formed containing $LiPF_6$ as by-product. As mentioned above, $LiPF_6$ can be removed easily from $LiPO_2F_2$ by extraction with a solvent.

The molar ratio of $POF_3$ to $Li_3PO_4$ is generally equal to or greater than 1.8:1. It is more preferably equal to or greater than 2:1. It is preferably equal to or lower than 5:1. According to one embodiment, the molar ratio of $POF_3$ to $Li_3PO_4$ is equal to or lower than 4:1. Preferably, the molar ratio of $POF_3$ to $Li_3PO_4$ is equal to or greater than 2 and equal to or lower than 4.

If desired, mixtures comprising $Li_3PO_2F_2$ and $LiPF_6$ in any desired ratio can be produced. In this case, $Li_3PO_4$ and LiF and sufficient $PF_5$ are introduced into the reaction. $PF_5$ forms $LiPF_6$ with the introduced LiF, and it forms $LiPO_2F_2$ (and some $LiPF_6$) with the $Li_3PO_4$ introduced into the reaction.

To summarize, a) the reaction of $Li_3PO_4$ with $PF_5$ according to reaction scheme (I) provides a reaction product which essentially consists of $LiPO_2F_2$ and LiF b) the reaction of $Li_3PO_4$ with $PF_5$ according to reaction scheme (II) provides a reaction product which essentially consists of $LiPO_2F_2$ and $LiPF_6$ c) the reaction of $Li_3PO_4$ with $POF_3$ according to reaction scheme (III) provides a reaction product which essentially consists of $LiPO_2F_2$ with at most minor amounts of impurities, e.g., LiF.

d) the reaction of a starting material comprising $Li_3PO_4$ and LiF with $PF_5$ provides mixtures of $LiPO_2F_2$ and $LiPF_6$ in any desired ratio.

Main by-products according to a) and b) are LiF and $LiPF_6$, respectively; only one of LiF and $LiPF_6$, or both, may be present. As outlined above, it is possible by properly selecting reaction conditions, especially the molar ratio of starting compounds (molar ratio of $POF_3$ and $PF_5$, respectively, to $Li_3PO_4$) to influence the presence of LiF and $LiPF_6$ as by-products. In some embodiments, the presence of LiF or $LiPF_6$ may be desired. In such an embodiment, no further purification may be necessary. In other embodiments, it may be desired to obtain purified $LiPO_2F_2$, which is free of LiF or $LiPF_6$.

If desired, the reaction mixture can be treated to obtain purified $LiPO_2F_2$; to obtain purified $LiPO_2F_2$, two embodiments are preferred.

According to one embodiment, $LiPO_2F_2$ can be purified including a step of extracting the reaction product with a solvent. $LiPO_2F_2$ can be isolated by using a solvent or a solvent mixture which preferably dissolves $LiPO_2F_2$. This is the preferred way to separate $LiPO_2F_2$ from mixtures which contain $LiPO_2F_2$ and LiF as impurity, e.g., when obtained in a reaction mentioned above under a) and c). The dissolved $LiPO_2F_2$ can be recovered from the solvent by removing it, e.g., by evaporation of the solvent. Optionally, a solution of $LiPO_2F_2$ in a suitable solvent may directly be applied for the manufacture of an electrolyte for Li ion batteries.

According to another embodiment, $LiPO_2F_2$ is purified from impurities by applying a solvent or solvent mixture which preferentially dissolves the impurity. This is the preferred way to separate $LiPO_2F_2$ and $LiPF_6$, e.g., when a reaction mixture comprising both is obtained in a reaction mentioned above under b). In a preferred embodiment, formed $LiPF_6$ is extracted with a solvent applicable in lithium ion batteries. In the following, certain solvents will be described which are preferably applied to separate $LiPO_2F_2$ and LiF by preferentially dissolving $LiPO_2F_2$.

If the reaction mixture comprises essentially only $LiPO_2F_2$ and LiF, the separation is best achieved by contacting the reaction mixture with solvents which preferentially dissolve $LiPO_2F_2$. Aprotic and protic organic and inorganic solvents are suitable, especially polar solvents. The preferred inorganic solvent is water. Organic protic or aprotic solvents can be used for the extraction, too.

Suitable protic organic solvents are alcohols. Alcohols with one, two or three hydroxy groups in the molecule are preferred. Methanol, ethanol, n-propanol, i-propanol, glycol and glycerin are preferred alcohols. Glycol alkyl ethers, e.g., diglycol methyl ether, are also suitable. Also acetone, in its tautomeric form, can be considered as protic solvent.

Aprotic polar solvents are also very suitable for the extraction of $LiPO_2F_2$ from the reaction mixture. Preferably, the aprotic organic solvent is selected from the group of dialkyl carbonates (which are linear) and alkylene carbonates (which are cyclic), and wherein the term "alkyl" denotes preferably C1 to C4 alkyl, the term "alkylene" denotes preferably C2 to C7 alkylene groups, including a vinylidene group, wherein the alkylene group preferably comprises a bridge of 2 carbon atoms between the oxygen atoms of the —O—C(O)—O— group; ketones, nitriles and formamides. Dimethyl formamide, carboxylic acid amides, for example, N,N-dimethyl acetamide and N,N-diethyl acetamide, acetone, acetonitrile, linear dialkyl carbonates, e.g., dimethyl carbonate, diethyl carbonate, methyl ethyl carbonate, cyclic alkylene carbonates, e.g., ethylene carbonate, propylene carbonate, and vinylidene carbonate, are suitable solvents.

It is also possible to use mixtures containing water and one or more organic protic or aprotic solvents. It is preferred that the pH of the water used for extraction, and of water-containing organic solvents applied for extraction, of the $LiPO_2F_2$ formed in the reaction is selected such that undesired hydrolysis of $LiPO_2F_2$ is prevented. Especially, the pH is equal to or lower than 7 to prevent hydrolysis. It is preferred to keep the pH at a value of equal to or lower than 7 during the contact of $LiPO_2F_2$ with the water or the mixture of water and organic solvent or solvents.

Mixtures of water and protic solvents can be applied for the isolation of $LiPO_2F_2$, for example, mixtures of water and alcohols with 1, 2 or 3 hydroxy groups, e.g., mixtures of water and methanol, ethanol, isopropanol, n-propanol, glycol, glycerin, or diglycol.

Mixtures of water and aprotic organic solvents, especially, polar aprotic solvents, can also be applied, for example, mixtures of water with one of the solvents mentioned above, e.g., with ethylene carbonate or propylene carbonate.

Of course, it also possible to apply mixtures which comprise water, one or more protic organic solvents, and one or more aprotic organic solvents. For example, mixtures containing water, an alcohol like methanol, ethanol or i-propanol, and a nitrile, for example, acetonitrile, or propylene carbonate, can be applied. The content of water in these mixtures is preferably between 1 and 99% by weight.

Aqueous or protic solvents may for example be applied when $LiPO_2F_2$ is prepared from $PF_5$ and $Li_3PO_4$.

Dimethyl carbonate and propylene carbonate are among the preferred solvents for reaction mixtures which essentially consist of $LiPO_2F_2$ and LiF because $LiPO_2F_2$ is at least fairly soluble in these solvents while LiF is essentially insoluble. Other very suitable solvents to extract $LiPO_2F_2$ from reaction mixtures comprising LiF obtained by the reaction of $POF_3$, $PF_5$ or their mixtures with $Li_3PO_4$ as main impurity are ethylene carbonate (EC), ethyl methyl carbonate (EMC), ethyl acetate, diethyl carbonate, a mixture of dimethyl carbonate and propylene carbonate (PC), acetonitrile, dimethoxyethane and acetone. The solubility of $LiPO_2F_2$ in these solvents at ambient temperature is compiled in the following table 1.

TABLE 1

Solubility of $LiPO_2F_2$ in certain solvents

| Solvent | Solubility of $LiPO_2F_2$ [g/100 g solvent] |
|---|---|
| Diethyl carbonate | 0.4 |
| Dimethyl carbonate/propylene carbonate (1:1 v/v) | 0.4 |
| Acetonitrile | 2.8 |
| Dimethoxyethane | 37 |
| Acetone | 20 |

The solubility of $LiPO_2F_2$ in acetonitrile and especially in dimethoxyethane and acetone is remarkably high. Acetone is not very well suited as a solvent for Li ion batteries, but it may advantageously be used for the purification of $LiPO_2F_2$ because it has a very high solubility for $LiPO_2F_2$ and a very low solubility for LiF. Thus, mixtures comprising LiF and $LiPO_2F_2$ can easily be separated by dissolving the $LiPO_2F_2$ in acetone and filtration to remove solid LiF $LiPO_2F_2$ can be recovered from its solutions in acetone, for example, by evaporation of the acetone.

The solubility of $LiPO_2F_2$ in dimethoxyethane is even higher than in acetone. Dimethoxyethane was considered as solvent or solvent additive for Li ion batteries. Thus, dimethoxyethane—which also dissolves LiF at most in negligible amounts—can be used for the purification of $LiPO_2F_2$ as described above in view of the use of acetone, and it can even be applied to raise the solubility of $LiPO_2F_2$ in Li ion battery solvents.

Solutions of $LiPO_2F_2$ in dimethyl carbonate, propylene carbonate and mixtures—which dissolve LiF at most in negligible amounts—are especially suitable for the manufacture of battery electrolytes.

For the isolation of $LiPO_2F_2$ from LiF or $LiPF_6$, and especially, if the reaction mixture contains $LiPO_2F_2$ and $LiPF_6$ as main impurity, water-free solvents are preferably applied.

This preferred embodiment—the use of essentially water-free solvents for working up the reaction mixture obtained in the reaction between $Li_3PO_4$ and $POF_3$, $PF_5$ or their mixtures—will be described now in detail.

If the reaction mixture contains essentially only $LiPO_2F_2$ and LiF, it is preferred to apply solvents which preferentially dissolve $LiPO_2F_2$.

If the reaction mixture contains essentially only $LiPO_2F_2$ and $LiPF_6$, it is preferred to apply solvents which preferentially dissolve $LiPF_6$.

It was surprisingly found that certain solvents can be applied successfully for both purposes; namely to dissolve $LiPO_2F_2$ when LiF is present as main impurity, and to dissolve preferentially $LiPF_6$ if it is the main impurity contained in the reaction mixture comprising $LiPO_2F_2$ as main product. It was found that LiF is only very sparingly soluble in aprotic organic solvents and that $LiPF_6$ has a comparably good solubility while the solubility of $LiPO_2F_2$ is in between.

Solvents for both purposes which are generally aprotic polar organic solvents, are known. Solvents which are useful as electrolyte solvents in lithium ion batteries can be applied. They are preferred because they would not have a detrimental effect on battery electrolytes or could even be used to provide battery electrolytes. Such solvents are generally known. Preferably, a solvent suitable as electrolyte solvent in lithium ion batteries is applied to extract $LiPF_6$.

In the following, preferred organic aprotic solvents for the workup of reaction mixtures are presented in detail.

Organic carbonates, especially dialkyl carbonates, e.g., dimethyl carbonate or diethyl carbonate, methyl ethyl carbonate, alkylene carbonate, e.g., ethylene carbonate or propylene carbonate, fluorinated solvents, e.g., mono-, di-, tri- and/or tetrafluoroethylene carbonate, are very suitable. Instead or additionally, the extraction of $LiPO_2F_2$ from mixtures with LiF or, respectively, of $LiPF_6$ from mixtures comprising $LiPO_2F_2$ may be performed with other solvents, for example, lactones, formamides, pyrrolidinones, oxazolidinones, nitroalkanes, N,N-substituted urethanes, sulfolane, dialkyl sulfoxides, dialkyl sulfites, as described in the publication of M. Ue et al. in J. Electrochem. Soc. Vol. 141 (1994), pages 2989 to 2996, or trialkylphosphates or alkoxyesters, as described in DE-A 10016816.

Alkyl carbonates with linear and branched alkyl groups and alkylene carbonates are especially suitable for preferentially dissolving $LiPO_2F_2$ in mixtures comprising LiF, and of $LiPF_6$ in mixtures comprising $LiPO_2F_2$, respectively, for example, ethylene carbonate, dimethyl carbonate, ethyl methyl carbonate (EMC), diethyl carbonate, and propylene carbonate (PC), see EP-A-0 643 433. Pyrocarbonates are also useful, see U.S. Pat. No. 5,427,874. Alkyl acetates, for example, ethyl acetate, N,N-disubstituted acetamides, sulfoxides, nitriles, glycol ethers and ethers are useful, too, see EP-A-0 662 729. Often, mixtures of these solvents are applied. Dioxolane is a useful solvent, see EP-A-0 385 724. For lithium bis-(trifluoromethansulfonyl)imide, 1,2-bis-(trifluoracetoxy)ethane and N,N-dimethyl trifluoroacetamide, see ITE Battery Letters Vol. 1 (1999), pages 105 to 109, are applicable as solvent. In the foregoing, the term "alkyl" preferably denotes saturated linear or branched C1 to C4 alkyl groups; the term "alkylene" denotes preferably C2 to C7 alkylene groups, including a vinylidene group, wherein the alkylene group preferably comprises a bridge of 2 carbon atoms between the oxygen atoms of the —O—C(O)—O— group, thus forming a 5-membered ring.

Fluorosubstituted compounds, for example, fluorinated carbonic esters which are selected from the group of fluorosubstituted ethylene carbonates, fluorosubstituted dimethyl carbonates, fluorosubstituted ethyl methyl carbonates, and fluorosubstituted diethyl carbonates are also suitable solvents for dissolving $LiPO_2F_2$ or $LiPF_6$, respectively. They are applicable in the form of mixtures with non-fluorinated solvents. The non-fluorinated organic carbonates mentioned above are for example very suitable.

Preferred fluorosubstituted carbonates are monofluoroethylene carbonate, 4,4-difluoro ethylene carbonate, 4,5-difluoro ethylene carbonate, 4-fluoro-4-methyl ethylene carbonate, 4,5-difluoro-4-methyl ethylene carbonate, 4-fluoro-5-methyl ethylene carbonate, 4,4-difluoro-5-methyl ethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoro ethylene carbonate, 4-(fluoromethyl)-5-fluoro ethylene carbonate, 4-fluoro-4,5-dimethyl ethylene carbonate, 4,5-difluoro-4,5-dimethyl ethylene carbonate, and 4,4-difluoro-5,5-dimethyl ethylene carbonate; dimethyl carbonate derivatives including fluoromethyl methyl carbonate, difluoromethyl methyl carbonate, trifluoromethyl methyl carbonate, bis(fluoromethyl) carbonate, bis(difluoro)methyl carbonate, and bis(trifluoro) methyl carbonate; ethyl methyl carbonate derivatives including 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate; and diethyl carbonate derivatives including ethyl (2-fluoroethyl) carbonate, ethyl (2,2-difluoroethyl) carbonate, bis(2-fluoroethyl) carbonate, ethyl (2,2,2-trifluoroethyl) carbonate, 2,2-difluoroethyl 2'-fluoroethyl carbonate, bis(2,2-difluoroethyl) carbonate, 2,2,2-trifluoroethyl 2'-fluoroethyl carbonate, 2,2,2-trifluoroethyl 2',2'-difluoroethyl carbonate, and bis(2,2,2-trifluoroethyl) carbonate.

Carbonic esters having both an unsaturated bond and a fluorine atom (hereinafter abbreviated to as "fluorinated unsaturated carbonic ester") can also be used as solvent to remove $LiPF_6$ from its mixture with $LiPO_2F_2$ or to dissolve $LiPO_2F_2$ to separate it from impurities, e.g., impurities like LiF. The fluorinated unsaturated carbonic esters include any fluorinated unsaturated carbonic esters that do not significantly impair the advantages of the present invention.

Examples of the fluorinated unsaturated carbonic esters include fluorosubstituted vinylene carbonate derivatives, fluorosubstituted ethylene carbonate derivatives substituted by a substituent having an aromatic ring or a carbon-carbon unsaturated bond, and fluorosubstituted allyl carbonates.

Examples of the vinylene carbonate derivatives include fluorovinylene carbonate, 4-fluoro-5-methylvinylene carbonate and 4-fluoro-5-phenylvinylene carbonate.

Examples of the ethylene carbonate derivatives substituted by a substituent having an aromatic ring or a carbon-carbon unsaturated bond include 4-fluoro-4-vinylethylene carbonate, 4-fluoro-5-vinylethylene carbonate, 4,4-difluoro-4-vinylethylene carbonate, 4,5-difluoro-4-vinylethylene carbonate, 4-fluoro-4,5-divinylethylene carbonate, 4,5-difluoro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate and 4,5-difluoro-4,5-diphenylethylene carbonate.

Examples of the fluorosubstituted phenyl carbonates include fluoromethyl phenyl carbonate, 2-fluoroethyl phenyl carbonate, 2,2-difluoroethyl phenyl carbonate and 2,2,2-trifluoroethyl phenyl carbonate.

Examples of the fluorosubstituted vinyl carbonates include fluoromethyl vinyl carbonate, 2-fluoroethyl vinyl carbonate, 2,2-difluoroethyl vinyl carbonate and 2,2,2-trifluoroethyl vinyl carbonate.

Examples of the fluorosubstituted allyl carbonates include fluoromethyl allyl carbonate, 2-fluoroethyl allyl carbonate, 2,2-difluoroethyl allyl carbonate and 2,2,2-trifluoroethyl allyl carbonate.

The extraction of $LiPO_2F_2$ from mixtures containing LiF as impurity and the extraction of $LiPF_6$ as impurity from mixtures also containing $LiPO_2F_2$, respectively, may be performed in a known manner, for example, by stirring the reaction mixture with the solvent (extractant) directly in the reactor, or after removing the reaction mixture from the reactor and optionally crushing or milling, in a suitable vessel, e.g., a Soxhlet vessel. The extraction liquid contains a Li salt and may be further processed.

If the separation process served to remove $LiPF_6$ from $LiPO_2F_2$, the liquid phase containing $LiPF_6$ dissolved in the solvent can be separated from the non-dissolved $LiPO_2F_2$ in a known manner. For example, the solution can be passed through a filter, or it can be decanted, or the separation can be effected by centrifugation. If desired, $LiPF_6$ can be recovered by removing the solvent, e.g., by evaporation.

The remaining undissolved $LiPO_2F_2$ can be stored or can be subjected to further purification treatments to obtain pure solid $LiPO_2F_2$. This can be performed in a known manner. For example, adhering solvent can be removed by evaporation which may preferably be performed in a vacuum depending on the boiling point of the adhering solvent or solvents.

If the separation process served to dissolve $LiPO_2F_2$, the solid phase remaining after extraction can be separated in a known manner from the extracting solvent containing dissolved $LiPO_2F_2$. For example, the solution containing $LiPO_2F_2$ can be passed through a filter, or it can be decanted, or the separation can be effected by centrifugation. The undissolved residue contains essentially all LiF which can be recovered in pure form for example by re-crystallization.

The dissolved $LiPO_2F_2$ can be recovered from the solution by evaporation of the solvent to obtain pure solid $LiPO_2F_2$. This can be performed in a known manner. For example, adhering solvent can be removed by evaporation which may preferably be performed in a vacuum depending on the boiling point of the adhering solvent or solvents.

If the reaction mixture contains $LiPO_2F_2$ and significant amounts of both LiF and $LiPF_6$, it is preferred first to remove $LiPF_6$ with a solvent preferentially dissolving $LiPF_6$, and then to apply a solvent which preferentially dissolves $LiPO_2F_2$ over LiF. It is possible to apply the same solvent and to perform a step-wise purification. In the first step, $LiPF_6$ is dissolved by treating the reaction mixture with the solvent which preferably is one of those mentioned above. Due to the good solubility of $LiPF_6$ it will be dissolved first and can thus be removed from the reaction mixture. The reaction mixture recovered from the first treatment step is then again treated with a solvent which is preferably one of those mentioned above. Now, $LiPO_2F_2$ is preferentially dissolved. LiF remains as solid. Dissolved $LiPO_2F_2$ can then recovered from the solution as mentioned above. The isolated $LiPO_2F_2$ can be used as additive for the manufacture of lithium ion batteries. It can also be used as additive for Li-sulfur batteries and for Li-oxygen batteries or Li-air batteries.

Isolated solid $LiPO_2F_2$ can be re-dissolved in any suitable solvent or solvent mixture. The solvents mentioned above, including acetone and dimethoxyethane, are very suitable. Since its main use is as electrolyte salt or salt additive in the field of lithium ion batteries, it may be preferably dissolved in a water-free solvent used for the manufacture of the electrolyte solutions of lithium ion batteries. Such solvents are disclosed above.

A solution of $LiPO_2F_2$ in propylene carbonate for example contains, under standard conditions (25° C., 1 Bara), up to about 3% by weight of $LiPO_2F_2$ relative to the total weight of the solution. In other solvents or solvent mixtures, the amount of $LiPO_2F_2$ which dissolves at a given temperature will vary but can easily be determined by simple tests.

Other highly suitable solvents with a high dissolving power for $LiPO_2F_2$ (e.g., dimethoxyethane and acetonitrile) are given above.

The advantage of the processes of the invention is that the reaction speed is very high even at ambient temperature. Pure crystalline $LiPO_2F_2$ can be obtained from cheap starting material, for example, when extracted from the reaction mixture containing $LiPO_2F_2$ and LiF with dimethyl carbonate or propylene carbonate as solvent and subsequent removal of the solvent, e.g., in a vacuum.

An advantage of using $POF_3$ is that it can be prepared essentially free of HCl even in chlorine-fluorine exchange reactions. Since the boiling point (b.p.) of $POF_3$, −40° C., is higher than that of HCl (the b.p. of HCl is −85.1° C.) in contrast to $PF_5$ (the boiling point of which is −84.4° C. which is similar to that of HCl), a simple distillation or condensation technique under pressure can be used for purification of the $POF_3$ intermediate product, which makes the present process more economical.

Another aspect of the present invention is the use of $POF_3$ for the manufacture of $LiPO_2F_2$.

Should the disclosure of any of the patents, patent applications, and publications that are incorporated herein by reference be in conflict with the present description to the extent that it might render a term unclear, the present description shall take precedence.

EXAMPLES

The following examples will describe the invention in further detail without the intention to limit it.

Example 1

Synthesis and isolation of $LiPO_2F_2$ using $PF_5$ as P—F Bond Containing Compound 5 g $Li_3PO_4$ were given into an autoclave. Gaseous $PF_5$ was introduced into the reactor. An immediate pressure drop was observed which was allocated to the consumption of $PF_5$ in the reaction with $Li_3PO_4$ forming $LiPO_2F_2$ and LiF. Further $PF_5$ was introduced into the autoclave until the pressure remained at about 3 to 4 bar (abs.) indicating that no further reaction occurred. After removal of the gaseous phase, the remaining solid had a weight of 12 g and was analyzed with XRD. The characteristic signals of $LiPO_2F_2$, of LiF and of $LiPF_6$ were identified. For the isolation of $LiPO_2F_2$, the solid can be heated to about 200° C. to decompose any $LiPF_6$ to form LiF and $PF_5$; after removal of the $PF_5$, the remaining solid essentially consists of $LiPO_2F_2$ and LiF. The solid is given into a Soxhlet vessel and be extracted with dimethyl carbonate. From the combined solutions, the solvent is removed by evaporation in a rotary evaporator, and the resulting solid is subjected to analysis by XRD, F-NMR and P-NMR.

Analytical data of $LiPO_2F_2$:

XRD:2-Theta values: 21.5 (strong); 22.0; 23.5; 27.0 (strong); 34.2; 43.2

$^{19}$F-NMR (470.94 MHz; solution in D-acetone): −84.25 ppm (doublet, the 2 lines at −83.3 ppm and −85.2 ppm, coupling constant 926 Hz)

$^{31}$P-NMR (202.61 MHz; solution in D-acetone): −19.6 ppm (triplet, the 3 lines at −12.3 ppm, −16.9 ppm and −21.5 ppm; coupling constant 926 Hz).

Example 2

Electrolyte Solution for Lithium Ion Batteries, Lithium-Sulfur Batteries and Lithium-Oxygen Batteries 23 g of $LiPO_2F_2$, 117 g of $LiPF_6$, 50 g monofluoroethylene carbonate ("F1EC") and propylene carbonate ("PP") are mixed in amount such that a total volume of 1 liter is obtained. The resulting solution contains 0.77 mol of $LiPF_6$ and 0.23 mol $LiPO_2F_2$. Thus, the amount of lithium compounds is about 1 mol per liter and corresponds to the concentration of lithium salts commonly used for the batteries, especially lithium ion batteries.

Example 3

Synthesis and Isolation of $LiPO_2F_2$ using $POF_3$ as P—F Bond Containing Compound 3.5 g $Li_3PO_4$ were given into an autoclave. Gaseous $POF_3$ was introduced into the reactor. An immediate pressure drop was observed which was allocated to the consumption of $POF_3$ in the reaction with $Li_3PO_4$ forming $LiPO_2F_2$. Further $POF_3$ was introduced from a separate metal container with a final pressure of around 6 atm which decreased continuously. The temperature of the vessel was raised up to 80° C. for one hour, and then the gas connection was interrupted and the reaction mixture was cooled down to room temperature while the excess gas phase was pumped off.

After removal of the gaseous phase, the remaining white solid had a weight of 5.7 g and was analyzed with XRD. The characteristic signals of only $LiPO_2F_2$ were identified. The solid is given into a Soxhlet vessel and be extracted with dimethyl carbonate. From the combined solutions, the solvent is removed by evaporation in a rotary evaporator, and the resulting solid is subjected to analysis by XRD, F-NMR and P-NMR.

The analytical data of $LiPO_2F_2$ obtained in example 3 corresponded to those of $LiPO_2F_2$ obtained in example 1.

Example 4

Electrolyte Solution for Lithium Ion Batteries, Lithium-Sulfur Batteries and Lithium-Oxygen Batteries 117 g of $LiPF_6$, 23 g of $LiPO_2F_2$ obtained analogously to example 3, 50 g monofluoroethylene carbonate ("F1EC") and propylene carbonate ("PP") are mixed in amount such that a total volume of 1 liter is obtained. The resulting solution contains 0.77 mol of $LiPF_6$ and 0.23 mol $LiPO_2F_2$. Consequently, the amount of lithium compounds is about 1 mol per liter and thus corresponds to the concentration of lithium salts commonly used for the batteries, especially lithium ion batteries.

The invention claimed is:

1. A method for the manufacture of $LiPO_2F_2$ comprising a step of reacting $Li_3PO_4$ and a compound having a P—F bond, said compound being selected from the group consisting of $POF_3$, $PF_5$, and mixtures thereof, thereby forming a mixture comprising $LiPO_2F_2$.

2. The method of claim 1 wherein $PF_5$ is reacted with $Li_3PO_4$ thereby forming said mixture comprising $LiPO_2F_2$.

3. The method of claim 2 wherein the molar ratio of $PF_5$ to $Li_3PO_4$ is equal to or greater than 1 and lower than 2.

4. The method of claim 2 wherein the molar ratio of $PF_5$ to $Li_3PO_4$ is equal to or greater than 2 and lower than 4.

5. The method of claim 2 wherein the reaction between $PF_5$ and $Li_3PO_4$ is performed at ambient temperature.

6. The method of claim 1 wherein $POF_3$ is reacted with $Li_3PO_4$ thereby forming said mixture comprising $LiPO_2F_2$.

7. The method of claim 6 wherein the molar ratio of $POF_3$ to $Li_3PO_4$ is equal to or greater than 2 and equal to or lower than 4.

8. The method of claim 6 wherein the reaction between $POF_3$ and $Li_3PO_4$ is performed at a temperature from 50 to 90° C.

9. The method of claim 1 wherein LiF is formed during said reacting step and is present in said mixture comprising $LiPO_2F_2$, and wherein the $LiPO_2F_2$ formed is extracted from said mixture comprising $LiPO_2F_2$ and LiF with a solvent selected from the group consisting of dimethyl carbonate, propylene carbonate, acetonitrile, dimethoxyethane, acetone, and mixtures of two or more thereof.

10. The method of claim 9 wherein $LiPF_6$ is formed during said reacting step and is decomposed to form LiF and $PF_5$ before extraction of $LiPO_2F_2$.

11. The method of claim 1, wherein $LiPF_6$ is formed during said reacting step and is present in said mixture comprising $LiPO_2F_2$, and wherein said formed $LiPF_6$ is extracted with a solvent from the mixture comprising $LiPO_2F_2$ and $LiPF_6$.

12. The method of claim 11 wherein said solvent used to extract $LiPF_6$ is a solvent suitable as electrolyte solvent in lithium ion batteries.

13. The method of claim 12 wherein said solvent used to extract LiPF6 is selected from the group consisting of dimethyl carbonate, methyl ethyl carbonate, propylene carbonate, acetonitrile, dimethoxyethane, acetone, and mixtures of two or more thereof.

14. The method of claim 9 wherein the solvent used to extract $LiPO_2F_2$ is removed from $LiPO_2F_2$ to isolate a purified $LiPO_2F_2$.

15. A method for the manufacture of $LiPO_2F_2$ comprising utilizing phosphoryl fluoride ($POF_3$) as a reactant in a reacting step with lithium ($Li_3PO_4$) which forms $LiPO_2F_2$.

16. The method of claim 15 wherein $POF_3$ is introduced into the reacting step in gaseous form.

17. The method of claim 15 wherein the reaction between $POF_3$ and $Li3PO_4$ is performed at a temperature from 50 to 90° C.

* * * * *